Sept. 2, 1952        J. J. KENNEDY        2,608,843
RACK WITH DRIP CATCHER
Filed April 19, 1946
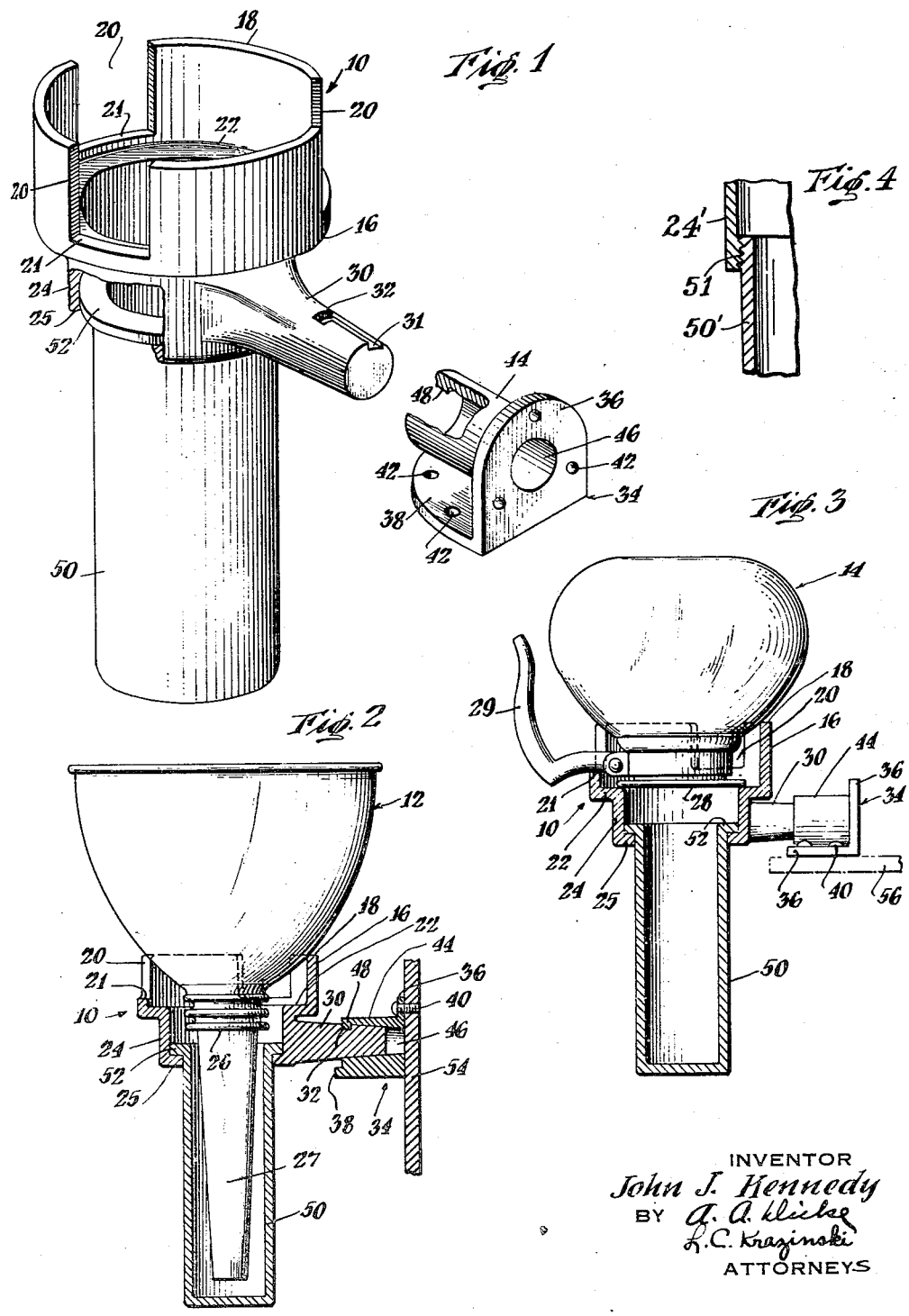
INVENTOR
John J. Kennedy
BY *A. A. Klicka*
*L. C. Krazinski*
ATTORNEYS Patented Sept. 2, 1952

2,608,843

UNITED STATES PATENT OFFICE 2,608,843

RACK WITH DRIP CATCHER

John J. Kennedy, Richmond Hill, N. Y.

Application April 19, 1946, Serial No. 663,549

2 Claims. (Cl. 65—65)

This invention relates to rack with drip catcher particularly to devices for supporting various types of articles, and has for its primary object to provide a safe and convenient receptacle for holding decanters, different sizes of upper and lower bowls of coffee makers, and the like.

In the preparation of certain beverages, such as coffee, it is customary to remove the upper bowl of the coffee maker containing the coffee grounds, after the mixture has boiled a predetermined time, and deposit it upon a table or some convenient resting place. Since the bowl is usually of a round, funnel-shaped configuration and is of fragile material, it is apt to roll off the table, with obvious results. Further, the storage of both lower and upper bowls, while not in use, is quite a problem, with a high percentage of breakage occurring in view of the lack of a safe and convenient receptacle therefor.

It is accordingly another object of the invention to provide an improved, simplified, and inexpensive device for supporting fragile articles, thereby preventing breakage thereof.

It is still another object of the invention to provide a universal receptacle for holding either top or bottom bowls of coffee makers, including bowls of different sizes.

It is yet another object of the invention to provide an improved holder that can be readily and removably secured to a vertical or horizontal support, thereby economizing in space.

It is a further object of the invention to provide an improved sanitary holder and draining device.

With the above objects in view, one embodiment of the invention discloses a hollow receptacle having a stepped supporting surface for carrying one of a plurality of variously sized articles, particularly upper or lower bowls of coffee makers and the like, wherein the large size bowl is adapted to be supported by the upper or wall portion of the receptacle, while the smaller type upper bowl or lower bowl may be supported upon an intermediate portion or ledge thereof, the lower portion thereof being employed as a drip catcher. Slots are provided in the upper wall for permitting projection therethrough of the handle of the lower bowl. The receptacle includes a bracket that may be secured to a vertical or horizontal support, a laterally extending arm of the receptacle having a bayonet slot for ready engagement with and disengagement from the mounting bracket.

A more complete understanding of the invention will be obtained from the following description of a preferred embodiment thereof, taken in connection with the accompanying drawing, in which:

Fig. 1 is an exploded perspective view, partly in section, of the invention, illustrating the detailed parts thereof;

Fig. 2 is a longitudinal vertical section of the receptacle of Fig. 1, illustrating disposition therein of a large upper coffee making bowl;

Fig. 3 is a view similar to Fig. 2, illustrating disposition within the receptacle of a bottom bowl of a coffee maker; and Fig. 4 is a partial sectional view illustrating another embodiment of the invention in which the drip catcher is shown threadedly engageable with the receptacle.

Referring now to the drawing, there is shown a receptacle or holder 10 for supporting miscellaneous articles, including particularly coffee making devices, comprising the usual top bowl 12 (Fig. 2) and base 14 (Fig. 3), in which are respectively placed ground coffee and water. In such devices it is customary to employ various sizes of bowls, depending upon the number of cups of beverage to be prepared. These bowls range from the two cup size to about the twelve cup size. Accordingly to carry any one of said bowls, the holder 10 is formed with a hollow body 16, having at its upper portion an arcuately shaped upstanding member or wall 18, with slotted openings 20 extending from the top to a point above the bottom thereof, so that a ridge or protuberance 21 is formed, as shown particularly in Fig. 1. At the base of wall 18 is formed an inwardly extending platform or ledge 22, at the inner extremity of which is formed a depending wall 24. While the ledge 22 is shown substantially horizontal, it may be sloped downwardly from wall 18 to wall 24 to facilitate draining of liquid, as will appear hereinafter. An inwardly extending ledge or platform 25 is shown connected to the lowermost edge of wall 24, so that both ledges 22, 25 form an inwardly stepped arrangement. The upper edge of wall 18 is readily adapted to support a large type of top bowl 12, as seen in Fig. 2, the usual sealing collar 26 and stem 27 freely depending therefrom. The smaller type of top bowl 12 (not shown), is, however, of such dimensions that it will be seated upon ledge 22 with the inner peripheral surface of wall 18 embracingly engaging the sides thereof. The decanter or bottom bowl 14, is adapted to be supported in an inverted manner, as seen in Fig. 3, the pouring lip 28 resting on the ledge 22 and handle 29 extending through the slot 20 and also resting upon the ridge 21.

Extending laterally from the body 16 of the receptacle 10 is shown a member or arm 30, preferably tapered, and having a longitudinal keyway or slot 31, the innermost end thereof terminating in a transverse slot 32. The combination of slots 31 and 32 form what may be termed a bayonet slot. Associated with arm 30 is a bracket 34, having a pair of sides 36, 38 preferably disposed at right angles with respect to each other, so that the bracket 34 may be secured in any suitable manner, such as by screws 40, through holes or openings 42 to either a vertical or horizonal support, as shown respectively in Figs. 2 and 3. A tubular element 44, which extends from side 36, is shown with a tapered bore 46 complementary to the tapered portion of arm 30 with which it coacts, the outer extremity of the inner periphery of tubular element 44 being provided with a radial protuberance or key 48 for mesh and locking engagement with slots 31, 32. The outer end of bore 46 being of larger diameter than its inner end, facilitates connection of the arm 30 with the bracket 34.

The lower portion of the receptacle 10 is shown with a drain cup or drip catcher 50, which preferably consists of a hollow member closed at the bottom with an outwardly turned flange 52 at the top, which flange is adapted to rest upon ledge 25, as seen more clearly in Figs. 2 and 3. This arrangement permits of a ready removal and assembly of the drip catcher 50.

In operation, the bracket 34 is first secured by the usual screws 40 to the surface to which it is to be attached, such as a vertical wall 54 (Fig. 2) or to a horizontal surface 56 (Fig. 3). It is to be noted that the arm 30 should be of a predetermined length in order to permit the largest size bowl to be carried by the receptacle 10. The arm 30 is then placed with the slot 31 in mesh engagement with protuberance or key 48 and pushed into the bore 46 until the protuberance 48 is received within slot 32, after which the arm 30 is rotated in a counterclockwise direction, as viewed from the front or entrance to bore 46 of bracket 34. The holder 10 is thus disposed in a vertical position and in locking engagement with its associated bracket 34. The receptacle 10 is now in readiness for supporting any suitable container or bowl, as shown in Figs. 2 and 3. In the normal use of the receptacle 10 the top bowl 12, either before or after having been washed, may be placed therein while still in a moist condition. Any fluid within the bowl 12 will flow downwardly and collect in the drip catcher 50. It is thus seen that the receptacle 10 functions as a sanitary drainer, as well as a support for fragile containers of various sizes.

In placing a decanter or bottom bowl 14 on the receptacle 10, bowl 14 is inverted with the lip 28 resting on the ledge 22 and the handle 29 within one of the slots 20, the lower edge of said handle 29, as viewed in Fig. 3, resting upon ridge 21. The lower edges of the bowl 14 may also rest upon the upper edge of upstanding wall 18.

While this invention has ben shown and described as embodying certain features, merely for the purpose of illustration, it is, of course, understood that various modifications may be made in the details thereof without departing from the scope of the invention, as defined in the appended claims. For example, as shown in Figure 4, a drip catcher 50' may be threadedly secured to the body 16 by eliminating the flange 52 and associated ledge 25 from the drip catcher 50 and instead providing the inner peripheral surface of lower wall 24' and outer peripheral surface of the upper portion of drip catcher 50' with threads 51.

What is claimed is:

1. A support for holding one of a plurality of articles of various sizes comprising a hollow, rigid member open at both ends, an upper portion of said member for holding a large article, said upper portion including a vertically upstanding wall having at least one slot therein, a narrow portion of said wall forming a ridge at the bottom edge of said slot, an intermediate portion of said member for holding an article smaller than that adapted to be held in the upper portion, said intermediate portion including an annular ledge extending inwardly from the bottom of said wall, said smaller article being adapted to rest on said ledge and a handle on said smaller article being adapted to project through said slot and rest on said ridge, a second wall depending vertically from and integrally with the inner peripheral edge of said ledge, and a lower portion of said support for catching fluid from any one of said articles, said lower portion comprising a tubular element having a closed bottom adapted to be removably secured to said depending wall.

2. A support for holding one of a plurality of articles of various sizes comprising a hollow, rigid member open at both ends, an upper portion of said member including an upstanding wall with an inwardly extending, annular ledge at the bottom thereof, said wall having at least one slot therein, a narrow portion of said wall forming a bottom edge of said slot, a second wall depending from and integral with the inner peripheral surface of said ledge, an inwardly extending second ledge at the bottom of and integral with said second wall, and a lower portion of said support for catching fluid from any one of said articles, said lower portion comprising a hollow element having a closed bottom with a flange at the top for engagement with said second ledge.

JOHN J. KENNEDY.

REFERENCES CITED

The following references are of record in the file of this patent:

UNITED STATES PATENTS

| Number | Name | Date |
| --- | --- | --- |
| 28,597 | Niles | June 5, 1860 |
| 43,442 | Vandercar | July 5, 1864 |
| 284,531 | Berry | Sept. 4, 1883 |
| 328,922 | Culmer | Oct. 27, 1885 |
| 344,738 | Hollingsworth | June 29, 1886 |
| 523,068 | Gaul | July 17, 1894 |
| 847,014 | Lee | Mar. 12, 1907 |
| 858,393 | Horner | July 2, 1907 |
| 893,469 | Essmuller | July 14, 1908 |
| 902,340 | Staines | Oct. 27, 1908 |
| 1,937,939 | Behrens | Dec. 5, 1933 |
| 2,948,778 | Zoia | Feb. 27, 1934 |
| 1,973,447 | Schroeder | Sept. 11, 1934 |
| 2,074,448 | Young | Mar. 23, 1937 |
| 2,091,518 | Murphy | Aug. 31, 1937 |
| 2,112,944 | Wolcott | Apr. 5, 1938 |
| 2,174,093 | Perlman | Sept. 26, 1939 |
| 2,187,974 | Johnson | Jan. 23, 1940 |
| 2,216,255 | Tate | Oct. 1, 1940 |
| 2,281,652 | Wolcott | May 5, 1942 |
| 2,296,586 | Turoczy | Sept. 22, 1942 |
| 2,372,872 | Wolper | Apr. 3, 1945 |